United States Patent
Amirijoo et al.

(10) Patent No.: US 9,445,324 B2
(45) Date of Patent: Sep. 13, 2016

(54) METHOD AND ARRANGEMENT IN A WIRELESS COMMUNICATION NETWORK FOR DETERMINING A TYPE OF HANDOVER

(75) Inventors: Mehdi Amirijoo, Linköping (SE); Walter Müller, Upplands Väsby (SE); Peter Werner, Linköping (SE); Petter Bergman, Ljungsbro (SE)

(73) Assignee: TELEFONAKTIEBOLAGET LM ERICSSON, Stockholm (SE)

( * ) Notice: Subject to any disclaimer, the term of this patent is extended or adjusted under 35 U.S.C. 154(b) by 0 days.

(21) Appl. No.: 14/389,483

(22) PCT Filed: Mar. 28, 2012

(86) PCT No.: PCT/SE2012/050341
§ 371 (c)(1),
(2), (4) Date: Sep. 30, 2014

(87) PCT Pub. No.: WO2013/147657
PCT Pub. Date: Oct. 3, 2013

(65) Prior Publication Data
US 2015/0119040 A1    Apr. 30, 2015

(51) Int. Cl.
*H04W 36/00* (2009.01)
*H04W 36/24* (2009.01)
*H04W 36/08* (2009.01)

(52) U.S. Cl.
CPC ......... *H04W 36/0083* (2013.01); *H04W 36/24* (2013.01); *H04W 36/08* (2013.01)

(58) Field of Classification Search
CPC .... H04W 36/30; H04W 36/32; H04W 36/18
USPC .................................. 455/436–443; 370/331
See application file for complete search history.

(56) References Cited

U.S. PATENT DOCUMENTS

| 2002/0085519 | A1* | 7/2002 | Virtanen ............... H04W 36/30 370/335 |
| 2010/0173626 | A1 | 7/2010 | Catovic et al. |

(Continued)

FOREIGN PATENT DOCUMENTS

WO    2010121418 A1    10/2010

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.5.0, Mar. 2012, 1-302.

(Continued)

*Primary Examiner* — Christopher M Brandt
*Assistant Examiner* — Matthew Genack
(74) *Attorney, Agent, or Firm* — Patents on Demand, P.A.; Brian K. Buchheit; Scott M. Garrett

(57) ABSTRACT

The embodiments disclosed relates to a method and a network node that determines a time period between a first handover and a second handover of a user equipment. The first handover is to or from a first cell and the second handover is to or from a second cell. The network node sets a threshold value based on a difference in cell quality between the first cell and the second cell. The difference in cell quality is associated with the first or second handover. The network node then determines the type of handover, of at least one of the first and second handover, based on the time period and threshold value.

22 Claims, 7 Drawing Sheets

(56) References Cited

U.S. PATENT DOCUMENTS

| | | | |
|---|---|---|---|
| 2012/0069756 A1* | 3/2012 | Ji | H04W 36/0016 370/252 |
| 2013/0172001 A1* | 7/2013 | Gerlach | H04W 16/32 455/450 |
| 2013/0225171 A1* | 8/2013 | Singh | H04W 36/245 455/436 |

OTHER PUBLICATIONS

Unknown, Author, "Information to be included at Hand Over request messages, to avoid Ping-Pong Hand Over", 3GPP TSG-RAN WG3 Meeting #57, R3-071598, Source: T-Mobile, Athens, Greece, Aug. 20-24, 2007, 1-4.

* cited by examiner

First HO *from* cell 1

Second HO *from* cell 2

First HO *from* cell 1    Second HO *from* cell 2

First HO *from* cell 1    Second HO *to* cell 2

METHOD AND ARRANGEMENT IN A WIRELESS COMMUNICATION NETWORK FOR DETERMINING A TYPE OF HANDOVER

TECHNICAL FIELD

Embodiments herein relate to a network node and a method therein. In particular, it relates to determining a type of handover of a user equipment in a wireless communication network.

BACKGROUND

Communication devices such as User Equipments (UE) are also known as e.g. mobile terminals, wireless terminals and/or mobile stations. User equipments are enabled to communicate wirelessly in a cellular communications network or wireless communication system, sometimes also referred to as a cellular radio system or cellular networks. The communication may be performed e.g. between two user equipments, between a user equipment and a regular telephone and/or between a user equipment and a server via a Radio Access Network (RAN) and possibly one or more core networks, comprised within the cellular communications network.

The cellular communications network covers a geographical area which is divided into cell areas, wherein each cell area being served by a base station.

A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Special Mobile).

UMTS is a third generation mobile communication network, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

In 3rd Generation Partnership Project (3GPP) Long Term Evolution (LTE), base stations, which may be referred to as eNodeBs or even eNBs, may be directly connected to one or more core networks.

In LTE the downlink is based on orthogonal frequency division multiplexing (OFDM) while the uplink is based on a single carrier modulation method known as discrete Fourier transform spread OFDM (DFT-S-OFDM).

The E-UTRAN is made up of eNB nodes, which are connected to each other via the X2 interface. Both the S1 and the X2 interface may be divided into control plane and user plane parts.

Handover, or equivalently handoff, of user equipments between different cells is a key feature in mobile communication networks. In order to avoid unnecessary handovers of user equipments from a first cell to a second cell, a HandOver Margin, (HOM), may be used.

The HOM is the difference between the radio quality of the serving cell and the radio quality needed before attempting a handover i.e. when a handover is triggered. The radio quality may be measured either using Reference Signal Received Power (RSRP) or Reference Signal Received Quality (RSRQ).

The user equipment may trigger an intra-frequency handover procedure, i.e. a handover within the same frequency and usually between geographically separated base stations, by sending an event report to a serving base station. This event occurs when the user equipment measures that the target cell is better than the serving cell with a HOM. The user equipment is configured over Radio Resource Control (RRC) when entering a cell, and the HOM is calculated from the following configurable parameters:

$$HOM = Ofs + Ocs + Off - Ofn - Ocn + Hys$$

Where:
Ofs is a frequency specific offset of the serving cell
Ocs is a cell specific offset of the serving cell
Off is an offset in radio quality between the serving cell and a neighbor cell.
Ofn is a frequency specific offset of the neighbor cell
Ocn is a cell specific offset of the neighbor cell
Hys is the hysteresis for entering and leaving the event A3 condition The different events, such as event A3 above, for handover is further described in 3GPP TS 36.331 V10.5.0 (2012-03), section 5.5.4—Measurement report triggering.

Thus it is possible to change the HOM by modifying one or more of these parameters. For an inter-frequency handover, i.e. a handover from one frequency to another, a similar formula is used.

Another configurable parameter in relation to handover is the Time-to-trigger. Time-to-trigger is the time period required before triggering a handover attempt. If the user equipment experiences a better radio quality towards the target base station than towards the serving base station during this time period, then a handover attempt is triggered.

A problem with handover is handover oscillation. Handover oscillation is a behavior of a user equipment, where the user equipment during a short time period does handover from one cell to another and then back again one or several times.

The drawback of this behavior is:
 An increased risk for handover failure. Assuming that each handover has an inherent risk for failure, a larger number of handovers will increase the number of failures. There is a tradeoff here. If the handovers are delayed too much the risk for handover failure also increases.
 A reduced throughput due to temporary loss of radio link. Also regarding throughput there is a tradeoff situation. If the handovers are delayed too much, the user equipment will in average operate in worse radio conditions, giving lower throughput.
 An increased load on network elements, mainly eNodeB and Mobility Management Entity, MME, and transmission interfaces, S1 and X2. Each handover will trigger communication between the MME and the base station as well as between base stations, which will take up resources in the wireless communication network.

On the other hand, if handover oscillation takes place due to varying radio quality or radio conditions, rather than defects in user equipment or RAN implementation, there also is a gain from handover oscillation. The user equipment opportunistically and repeatedly finds the best radio conditions, and thus increases the maximal throughput.

One way to minimize handover oscillation is to configure the communication network with high HOMs and long handover time-to-trigger. This would delay and decrease the number of handovers generally, but as handovers are an essential function for user equipment mobility this would make the user equipments in average operate in worse radio conditions, and more often end up in situations where the radio link disconnects.

A handover oscillation may be defined as shown in FIG. 1. If $T<T_{osc}$, then the handover is considered as an oscillation handover. Or in other words, if the time period, T, from a first handover, from a cell A to a cell B, to a second handover, from a the cell B to the cell A, is shorter than a predefined time period $T_{osc}$ then handover oscillation may be declared.

A measurement related to user equipment oscillation is oscillation rate. There is an upper boundary for an acceptable oscillation rate originating from e.g., core network load. Also the oscillation rate is related to end-user performance. On one hand oscillation are harmful as this induces additional signalling and delays, and on the other hand, oscillations allow the user to be connected to the best cell. This needs to be balanced in order for the end-user to experience the best performance.

An issue is how to set the parameter $T_{osc}$ shown in FIG. 1, and thus how to determine if a handover is an oscillating handover or not. If $T_{osc}$ is set too high handovers will not be determined as oscillating handovers even if they cause unnecessary control signalling load, or decrease end-user performance. If $T_{osc}$ is set too low, also beneficial handovers are determined as oscillating handovers.

This will lead to that some handovers are determined to be handover oscillations in spite that they improve the throughput of the network, or that some handovers are not determined to be handover oscillations in spite that they decrease the throughput of the network, or both.

SUMMARY

It is therefore an object of embodiments herein to provide an improved way of determining a type of handover in a wireless network.

According to a first aspect of embodiments herein, the object is achieved by a method in a network node for determining a type of handover in a wireless communication network. The network node determines a time period between a first handover and a second handover of a user equipment. The first handover is to or from a first cell and the second handover is to or from a second cell. The network node sets a threshold value based on a difference in cell quality between the first cell and the second cell. The difference in cell quality is associated with the first or second handover. The network node then determines the type of handover, of at least one of the first and second handover, based on the time period and threshold value.

According to a second aspect of embodiments herein, the object is achieved by a network node for determining a type of handover in a wireless communication network. The network node comprises a processing circuit. The processing circuit is configured to determine a time period between a first handover and a second handover of a user equipment. The first handover is to or from a first cell and the second handover is to or from a second cell. The processing circuit is further configured to set a threshold value based on a difference in cell quality between the first cell and the second cell. The difference in cell quality is associated with the first or second handover. The processing circuit is further configured to determine the type of handover, of at least one of the first and second handover, based on the time period and threshold value.

BRIEF DESCRIPTION OF THE DRAWING

Examples of embodiments herein are described in more detail with reference to attached drawings in which.

DETAILED DESCRIPTION

Figure 1:
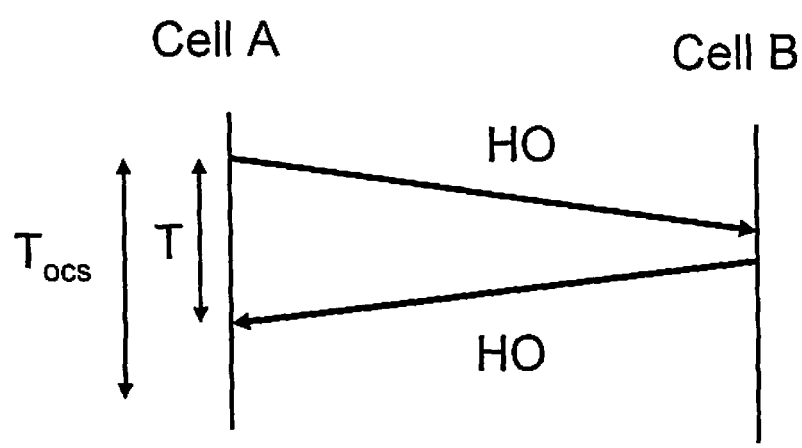
FIG. 1 is a signaling diagram illustrating the relation between a time period T and an oscillation threshold $T_{osc}$
Figure 2:
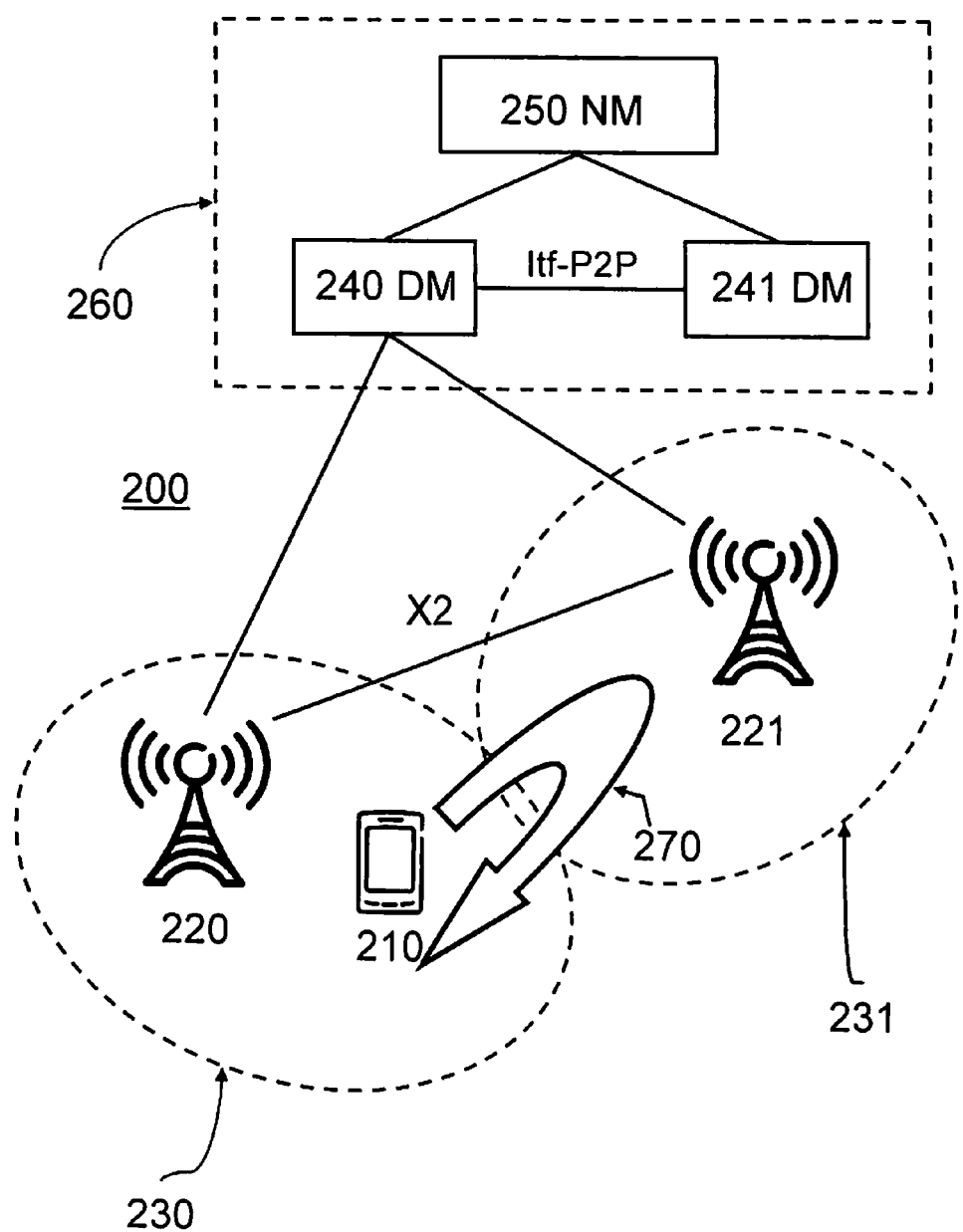
FIG. 2 is a schematic block diagram illustrating a wireless communication network with an exemplary scenario.

A wireless communications network 200 is depicted in FIG. 2 in which embodiments herein may be implemented. Examples of such a wireless communication network are LTE, WCDMA, GSM network, any 3GPP cellular network, Wimax, or any other cellular network or system. In the following LTE is used merely as an exemplifying standard to illustrate the main concept.

The wireless communication network 200 comprises one or more cells. In FIG. 2, a first base station 220 is serving a first cell 230 and a second base station 221 is serving a second cell 231. A third base station (not show in FIG. 2) serving a third cell (not shown FIG. 2) may also be present in the wireless communication network 200. The third base station will be discussed further below. The first, second and third base station 220, 221 are network nodes and may be e.g. Radio Base Stations, RBSs, which sometimes may be referred to as e.g. eNBs, eNodeBs, NodeBs, B nodes, or Base Transceiver Stations, BTSs, depending on the technology and terminology used. The base stations may be of different classes such as e.g. macro eNodeB, home eNodeB or pico base station, based on transmission power and thereby also cell size.

A user equipment 210 is located in the first cell 230. The user equipment 210 may be served by the first base station 220, the second base station 221 or the third base station. The user equipment 230 (as depicted in FIG. 2) may further be referred to as mobile telephone, cellular telephone, communication device or laptop with wireless capability, just to mention some further examples. The user equipment 210 in the present context may be, for example, portable, pocket-storable, hand-held, computer-comprised, vehicle-mounted mobile device, or any device enabled to communicate voice and/or data, via the RAN, with another entity, such as another user equipment or a server.

The wireless communication network 200 further comprises a first Domain Manager (DM) 240, also referred to as an operation and support system, OSS. The first DM 240 may manage the first, second and third base station 220 221. The first DM 240 may be referred to as a network node. The wireless communication network further comprises a second domain manager 241, also referred to as the Operation and Support System, OSS. The second DM 241 may manage the first, second and third base station 220 221. The DM 241 may be referred to as a network node. The first and second DM 240, 241 may further be managed by a Network Manager (NM) 250. The NM 250 may also be referred to as a network node.

The first and second DM 240, 241 together with the NM 250 forms a management system for controlling and adjusting how and when a handover takes place, for example, by adjusting handover parameters. Two base stations may be interfaced by an X2 interface used to interconnect eNodeBs, whereas the interface between two DMs is referred to as Itf-P2P interface. The Itf-P2P interface is the standardized interface between two domain managers, that is between two OSS.

As depicted in FIG. 2, the first base station 220 serves a first cell 230 and the second base station 221 serves a second cell 231. The user equipment 210 is capable of moving within the communication network 200. In an exemplary scenario the user equipment 210 is served by the first base station 220 and moves in the geographical vicinity of the second cell 231 served by the second base station 221. At any given time the user equipment 210 may experience a better cell quality towards the second base station 221 serving the second cell 231. When the user equipment 210 experiences a better cell quality towards the second base station 221, a handover of the user equipment 210 from first base station 220 to the second base station 221, may be initiated or triggered. In the event of a successful handover the user equipment 210 is now served by the second base station 221.

In a time period thereafter the user equipment 210 experience better cell quality towards the first base station 220 which triggers a second handover of the user equipment 210 back to the first base station 220. The handovers or movements are represented by an arrow 270.

An issue to answer is if the above described handovers are reflecting a handover oscillation leading to a lower overall performance of the communication network 200 or if it is reflecting necessary handovers that improves the overall performance of the communication network 200.

An example of embodiments of a method in a network node 220, 221, 240, 241, 250 will now be described with reference to a flowchart depicted in FIG. 3. Please note that the term base station and cell is used interchangeably.

A network node 220, 221, 240, 241, 250 as described herein may refer to any of the first base station 220, the second base station 221 or the third base station, the first or second DM 240, 241 or the NM 250 or any other network node in the above described wireless communication networks.

The method is performed in the network node 220, 221, 240, 241, 250 and is used for determining a type of handover in the wireless communication network. The type of handover may be either an oscillating handover or a non-oscillating handover. An oscillating handover may also be referred to as a ping-pong handover.

To be able to optimize the performance of the wireless communication network the method comprises the following actions, which actions may be taken in any suitable order.

Action 301

In order to know if a handover from the first base station to the second base station and back as described in relation to FIG. 2, is to be considered as an oscillating handover it is required to determine a time period from the first handover to the second handover. Therefore, the network node 220, 221, 240, 241, 250 determines a time period T between the first handover and the second handover of the user equipment 210. The first handover is to or from the first cell 230 and the second handover is to or from the second cell 231.

Action 302

In order to determine the handover type the time period T will be compared to a threshold. The network node 220, 221, 240, 241, 250 may set a threshold value $T_{osc}$ based on a difference in cell quality between the first cell 230 and the second cell 231. The difference in cell quality is associated with the first or second handover. The threshold value will be discussed more in detail below.

Action 303

In order to know if a handover is an oscillating handover the network node 220, 221, 240, 241, 250 determines the type of handover, of at least one of the first and second handover, based on the time period and threshold value.

With respect to the determination of handover type the first handover, the second handover or both handovers may be considered as an oscillating handover. As long as the determination is stringent, it does not matter if the first, second or both handovers are determined as oscillating handovers. The handover type may be any of an oscillating handover or a non-oscillating handover.

Thus, in some embodiments the type of handover is a first type of handover when the time period is below the threshold value. The type of handover maybe a second type of handover when the time period is above the threshold value.

Action 304

With information about the type of handovers that are being performed in the network the network node 220, 221, 240, 241, 250 may optionally adjust one or more handover parameters of the wireless communication network 200 based on the result of the determining of the type of handover. Examples of when it is desirable to not change one ore more handover parameters is when the number of oscillating handovers is at a satisfactory level.

The embodiments allow for more efficient adjustment of handover parameters, to as much as possible avoid unnecessary or even harmful handovers, but allow beneficial handovers. These principles allow a user equipment 210 to make use of the large variations in signal quality resulting in improved user performance without the wireless communication network 200 thinking that the handover parameters must be adjusted due to rapid handovers between two or more cells.

Alternative Handover Scenarios

The following alternative handover scenarios are applicable to any of the above described embodiments.

Figure 4A:
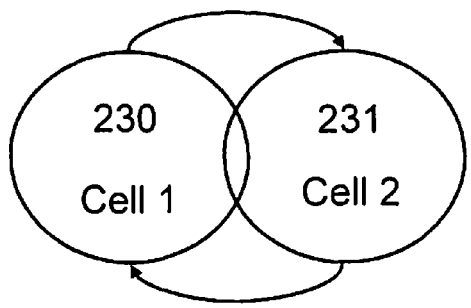
FIG. 4 a-c are schematic diagrams illustrating different handover scenarios.

As described in the embodiments above the user equipment 210 is being handed over to the second cell 231 and then back to the first cell 230, see FIG. 4a. FIG. 4a thus shows this exemplary embodiment where the first handover is a handover from the first cell 230 to the second cell 231 and the second handover is a handover from the second cell 231 to the first cell 230.

Figure 4B:
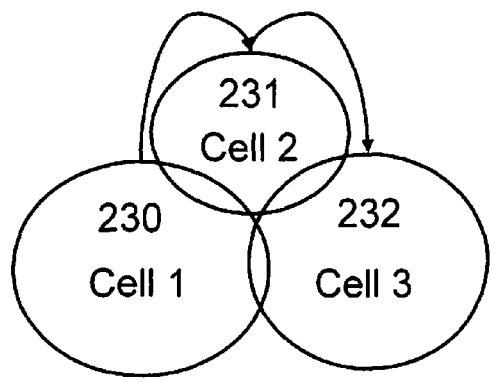

An alternative scenario is when a user equipment 210 leaves a first cell 230 to enter a second cell 231 and then some time after entering the second cell 231 leaves the second cell 231 to enter a third cell 232 as seen in FIG. 4b. FIG. 4b thus shows this exemplary embodiment where the first handover is a handover from the first cell 230 to the second cell 231 and the second handover is a handover from the second cell 231 to the third cell 232.

Figure 4C:
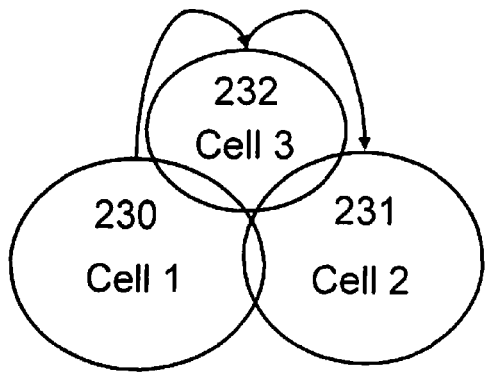

A similar scenario is depicted in FIG. 4c where a user equipment 210 leaves a first cell 230 to enter a third cell 232 and a time period thereafter leaves for a second cell 231. FIG. 4c thus shows an exemplary embodiment where the first handover is a handover from the first cell 230 to a third cell 232 and the second handover is a handover from the third cell 232 to the second cell 231.

Figure 5A:
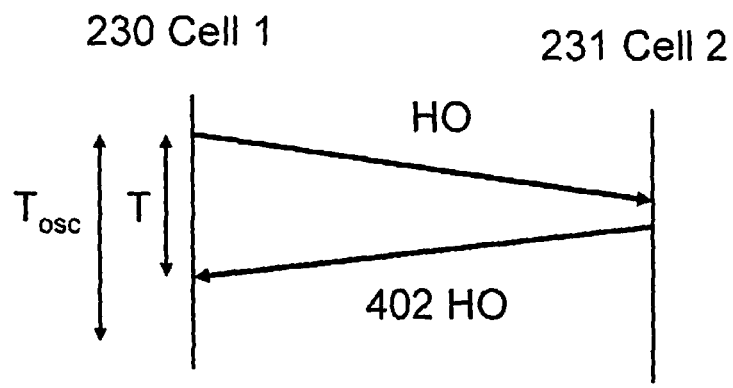
FIG. 5 a-c are signaling schemes illustrating the time aspect of the different handovers scenarios in FIG. 4 a-c FIG. 6 a-e are diagrams illustrating exemplary relations between a threshold value and difference in cell quality.
Figure 5B:
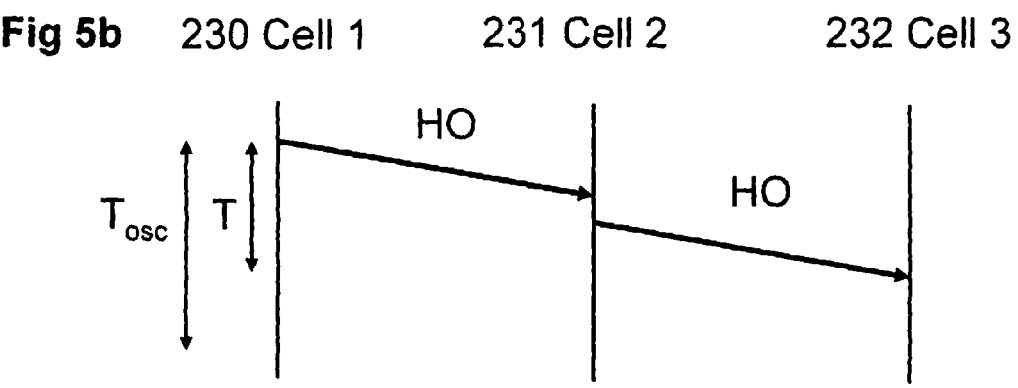
Figure 5C:
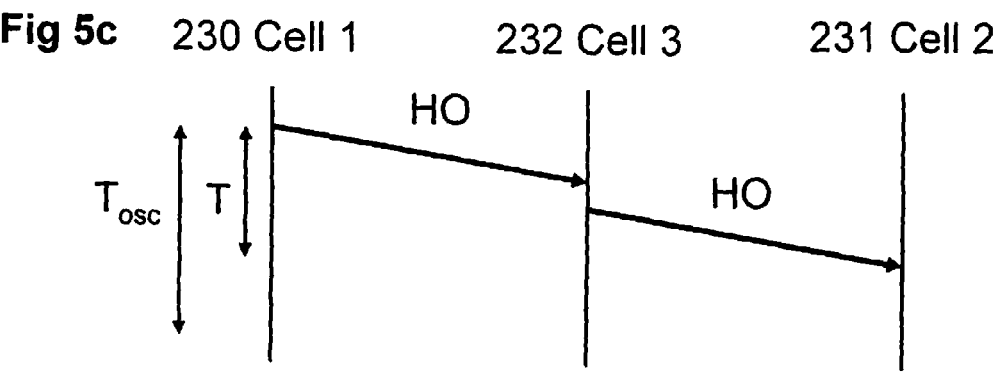

Examples of the time aspect of the handovers described in FIGS. 4a-4c is depicted in FIGS. 5a-5c. For FIG. 5a the time period T is from when the user equipment 210 is being handed over from, i.e. leaves, the first cell 230 until the user equipment 210 is being handed over to, i.e. enters, the first cell 230. The time instance when the user equipment 210 leaves the first cell 230 may be defined by, for example when the RBS sends the RRCConnectionReconfiguration message over RRC to the UE. The time instance that the user equipment 210 reenters the first cell 230 may be defined by, for example when a RLC/MAC connection is created between the UE and the RBS.

In FIG. 5b, the time period T is the time from when the user equipment 210 leaves the first cell 230 until the user equipment 210 enters the third cell 232. Lastly, FIG. 5c, depicts the time period T from when the user equipment 210 leaves the first cell 230 until the time the user equipment 210 enters the second cell 231. All time periods T depicted in FIGS. 5a-5b are illustrated as being shorter then a threshold $T_{osc}$. Obviously, the time period may be longer.

In the following, the embodiments will be described assuming the scenario depicted in FIG. 4a and FIG. 5a. It would of course be possible to apply the embodiments thought herein on the scenarios depicted in FIG. 4b and FIG. 4c and FIG. 5b and FIG. 5c.

Threshold Value

The threshold value $T_{osc}$ may take on any positive value. The term cell quality may be defined as any quality measure of a cell e.g. the quality the user equipment 210 is or may experience towards a base station serving a cell. Examples of cell quality may be bit rate, received radio power, signal to interference and noise ratio, channel rank, and other factors impacting user throughput, e.g., cell load.

The threshold value, $T_{osc}$ defines the condition by which a handover is considered to be harmful from a user equipment performance perspective, e.g. by decreasing the user equipment bit rate, or from the wireless communication network 200 perspective, decreasing the total throughput.

Previous solutions for setting $T_{osc}$ are based on a manual setting of $T_{osc}$ and do not consider the difference in cell quality of two cells between which the user equipment 210 being handed over back and forth.

If the difference of cell quality between the first cell 230 and the second cell 231 is small, then $T_{osc}$ shall be set to a high value in order to determine handovers as an oscillation. On the other hand, if the cell quality between the first cell 230 and the second cell 231 is high then $T_{osc}$ shall be set to a low value in order to allow for a short duration in the cell without determining the handover as an oscillation. Thus, the lower the difference is between the cell quality of the first cell 230 and the second cell 231, the longer $T_{osc}$ shall be set.

Figure 6A:
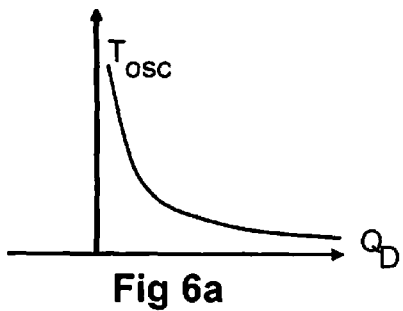

The difference in cell quality may be determined in a number of ways. Please note that the difference in cell quality may be between any of the described three cells depending on the scenario at hand. In general $T_{osc}$ is any function of cell quality difference between the first cell 230 and the second cell 231, as shown by FIG. 6a. The exception to the previous is the case where the threshold value is invariant to the quality difference. Let $Q_1$ denote the cell quality of the first cell, whereas $Q_2$ denote the cell quality of the second cell.

The cell quality difference $Q_D$ is defined as $Q_D=Q_2-Q_1$. Obviously, the shape of a function $F(Q_D)$ relating cell quality difference $Q_D$ between two cells to $T_{Osc}$ may take various shapes and it may be non-linear and discontinuous. One way of defining $F(Q_D)$ is to consider mappings between signal quality and bit rate or spectral efficiency. That is, instead of using for example signal quality measures one may map the signal quality measure to bit rate or spectral efficiency. The other way around is of course also possible, e.g. mapping the bit rate or spectral efficiency to signal quality.

Figure 6B:
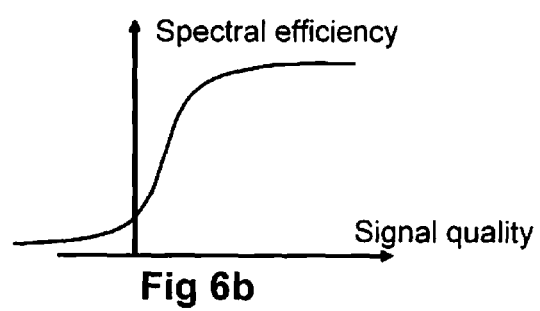

This mapping may be derived using theoretical derivations or from measurements campaigns and may take the form given in FIG. 6b, where spectral efficiency (b/s/Hz) is related to Signal to Interference and Noise Ratio (SINR).

Figure 6C:
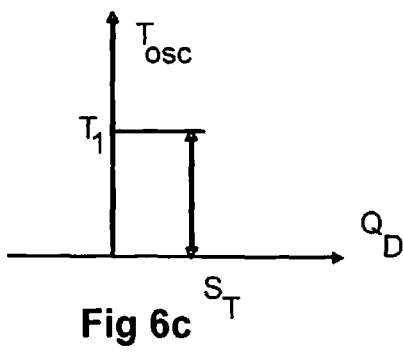

FIG. 6c illustrates a special case of $F(Q_D)$ where $T_{osc}$ is set equal to $T_1$ when the cell quality difference is below a second threshold, $S_T$. When the cell quality difference is above this second threshold value, $S_T$, the threshold value is set to zero, which means that the oscillations are discarded from the statistics.

It is thus possible according to some embodiments to set the threshold value to a non zero value when the difference in cell quality is below a second threshold value and setting the threshold value to zero when the difference in cell quality is above the second threshold value. This will provide a low complexity solution for managing the threshold used in determining the type of handover.

There are multiple ways of measuring the cell quality difference between two cells. This may be done using the RSRP or RSRQ of the serving cell and the candidate cell, aggregated CQI and rank indication information etc.

The difference in cell quality may thus be said to be established based on a first signal quality estimate of the first cell 230 and a second signal quality estimate of the second cell.

In other exemplifying embodiments the respective first and second quality estimate are estimates of received power, estimates of spectral efficiency or estimates of signal to interference and/or noise ratio.

RSRP and RSRQ measurements are reported to the first cell 230 just before the handover to second cell 231. As such the signal quality in the second cell 231 is available in the first cell 230 and the difference $Q_D$ may be determined.

Other measurements only available to the serving base station, for example, CQI and rank indication may only be measured by the user equipment 210 in the serving cell. With serving base station it is meant the base station that is currently serving the user equipment 210 and it may be any of the first 220, second 221 or third base station.

As such a non serving base station must store such information just after the handover and report to serving base station, e.g. over X2 through a dedicated element or in a user equipment history container. Alternatively, the CQI and rank information of a non serving cell 231 may be stored and reported by the user equipment 210 once the user equipment 210 connects to a serving cell.

Four examples on how to set the threshold value will now be explained.

1. Exemplary Embodiment of Setting the Threshold Value

The $T_{osc}$ value is determined from the difference between RSRP of the first cell and the second cell (delta-RSRP) by the formula:

$$T_{osc}=a+b/\text{delta-RSRP}$$

where a and b are a configurable parameters. The parameters a and b may be configured by the operator over Iff-N.

2. Exemplary Embodiment of Setting the Threshold Value

The $T_{osc}$ value is determined from the difference in spectral efficiency between the first cell and the second cell (delta-SE) by the formula:

$$T_{osc}=a+b/\text{delta-SE}$$

where a and b are a configurable parameters. The difference in spectral efficiency is acquired using FIG. 6b and using for example RSRQ or CQI measurements which are examples of signal quality, as described above. The parameters a and b may be configured by the operator over Itf-N.

3. Exemplary Embodiment of Setting the Threshold Value

Figure 6D:
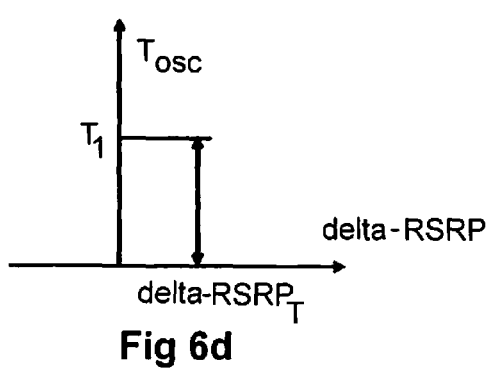

The $T_{osc}$ value is determined from the difference in RSRP between the first cell and the second cell using FIG. 6d. If delta-RSRP is less than delta-RSRP$_T$ then a handover is determined to be an handover oscillation if $T<T_{osc}$. Otherwise the handover is determined to be a non-oscillating handover. This is shown in 6d. The parameter delta-RSRP$_T$ may be set by the operator over Itf-N.

4. Exemplary Embodiment of Setting the Threshold Value

Figure 6E:
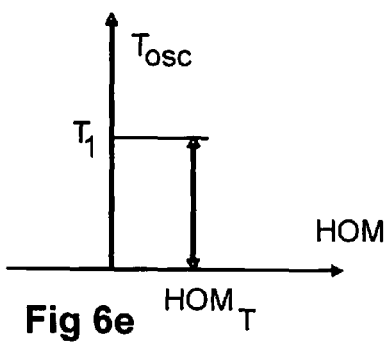

The $T_{osc}$ value is determined from the HOM between the first cell and the second cell using FIG. 6c. If HOM is less than HOM$_T$ then a handover is determined to be an handover oscillation if $T<T_{osc}$. Otherwise the handover is determined to be a non-oscillating handover. This is shown in FIG. 6e.

It is thus possible according to some embodiments to have the difference in cell quality determined based on a handover margin value for the first cell 230 and/or the second cell. The parameter Ocs$_T$ may be set by the operator over Itf-N.

Adjustment of Handover Parameters

The number of handover oscillation may be controlled by a function in the network node 220, 221, 240, 241, 250 e.g. the first or second base station 220, 221 or in the first or second DM 240, 241, in the NM 250 or in any combination thereof, by adjusting handover parameters in the wireless communication network 200.

The determination of type of handover may be used as an input to determine a handover oscillation rate. The handover oscillation rate may be defined as the ratio between the number of oscillations and the total number of handovers. In the same way as the handover parameters may be adjusted based on the determination of type of handover the handover parameters may also be adjusted by an operator of the wireless communication network 200 with respect to handover oscillation rate. The handover oscillation rate may also be controlled by functions in the first or second base station 220, 221 or in the first or second DM 240, 241 in the NM 250 or in any combination thereof.

In one exemplary embodiment an oscillation detection function in the network node 220, 221, 240, 241, 250 detects oscillating handovers and supplies this information to an oscillation prevention function. If the duration in the second cell 231 has been shorter than $T_{osc}$, then a message "oscillating handover" is sent to the oscillation prevention function. Otherwise a message "non-oscillating handover" is sent to that function. The oscillation prevention function builds oscillation statistics from the "oscillating handover" and "non-oscillating handover" messages, and use this statistics to perform automatic adjustments of e g Ofn, which is the frequency specific offset of the neighbor cell.

Other handovers parameters may include: a frequency specific offset of the first cell; a cell specific offset of the first cell; an a3-Offset; a frequency specific offset of the second cell; a cell specific offset of the second cell; a hysteresis value; a time to trigger a handover; an a5-Threshold1; an a5-Threshold2; a trigger Quantity; a s-Measure. These parameters are further described in 3GPP TS 36.331 V10.5.0 (2012-03), section 5.5.4-Measurement report triggering as well as pages 216, 224-225.

Alternatively, the report "oscillating handover" or "non-oscillating handover" is sent to the management system. The management system receives the messages and uses it to create statistics presented for a human user, for possible manual adjustment of the cell. Alternatively the network node 220, 221, 240, 241, 250 adjusts handover parameters from the determined type of handover or statistics thereof.

Figure 3:
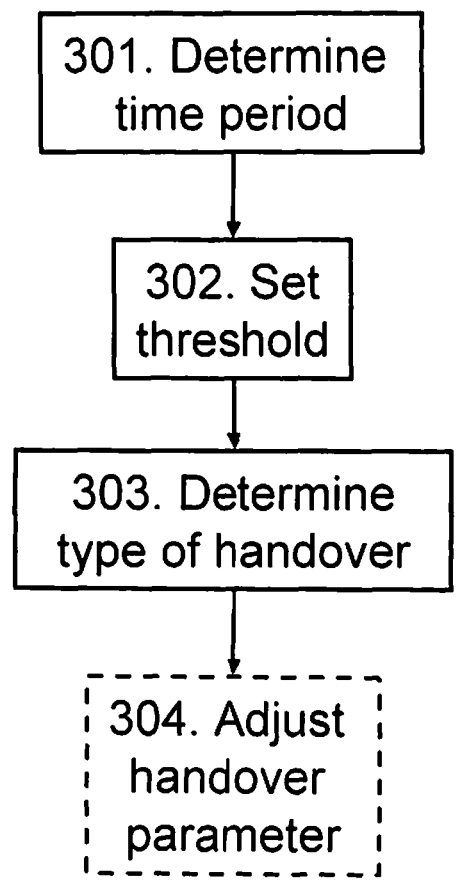
FIG. 3 is a flowchart illustrating embodiments of a method in a network node.
Figure 7:
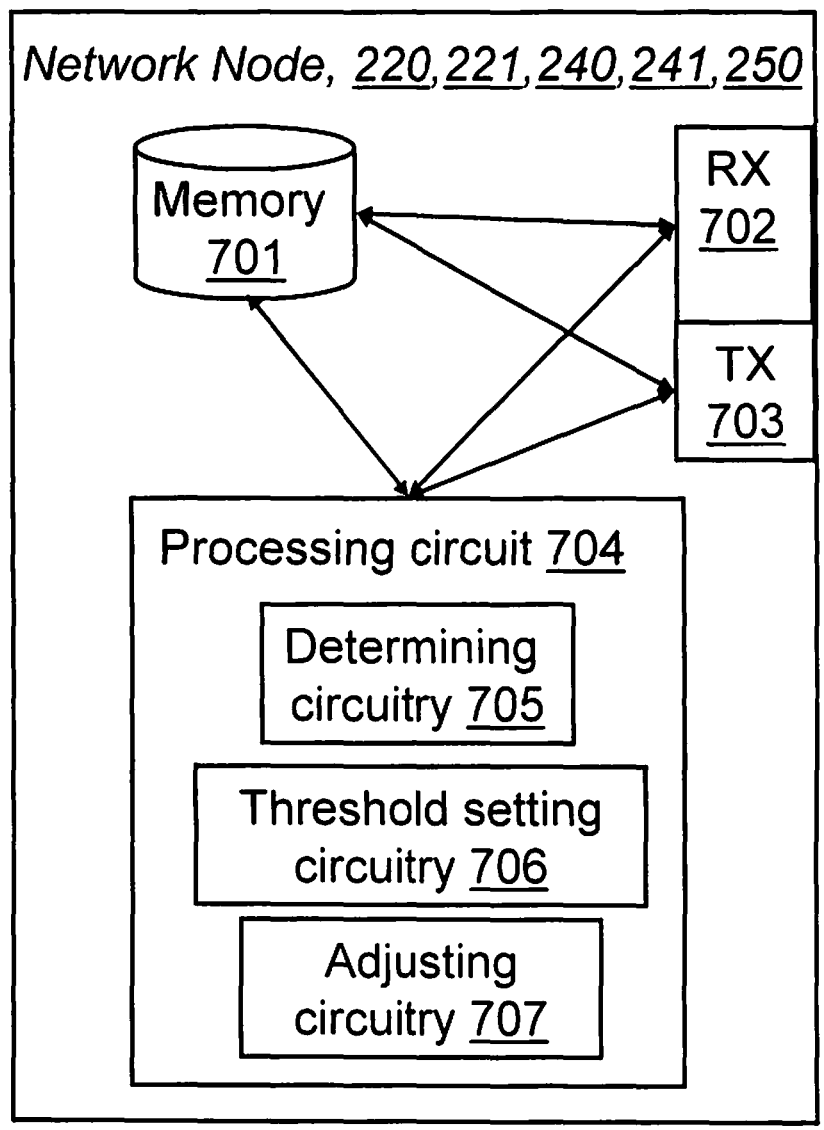
FIG. 7 is a schematic block diagram illustrating embodiments of a network node.

To perform the method actions for determining a type of handover in a wireless communication network 200 above in relation to FIG. 3, the network node 220, 221, 240, 241, 250 comprises the following arrangement depicted in FIG. 7. The network node 220, 221, 240, 241, 250 may be any of the first base station 220, the second base station 221, the third base station, the first DM 240, the second DM 241 or the NM 250. It is also possible that some of the method actions are performed in one network node 220, 221, 240, 241, 250 and some of the method action is performed in another network node 220, 221, 240, 241, 250. For example, the determining of the type of handover may be performed in the first, second or third base station 220, 221 and the adjustment of the handover parameters may be performed in either the first or second DM 240, 241 or in the NM 250.

The network node 220, 221, 240, 241, 250 comprises a processing circuit 704. The processing circuit 704 is configured to determine a time period between a first handover and a second handover of a user equipment 210. The first handover is to or from a first cell 230 and the second handover is to or from a second cell 231. The determination of the time period may be determined by a determining circuitry 705.

The processing circuit 704 is further configured to set a threshold value based on a difference in cell quality between the first cell 230 and the second cell 231. The difference in cell quality is associated with the first or second handover. The threshold value may be set by a threshold setting circuitry 706.

The processing circuit 704 is further configured to determine the type of handover, of at least one of the first and second handover, based on the time period and threshold value. The determination of the type of handover may be determined by the determining circuitry 705.

In some embodiments the type of handover is a first type of handover when the time period is below the threshold value and/or wherein the type of handover is a second type of handover when the time period is above the threshold value.

In some embodiments the processing circuit 704 is further configured to adjust one or more handover parameters of the wireless communication network 200 based on the result of the determined type of handover. The adjustment of the handover parameters may be adjusted by an adjusting circuitry 707.

In some embodiments the one or more handover parameters are: a cell specific offset of the first cell; a cell specific offset of the second cell; a hysteresis value; a time to trigger handover.

In some embodiments the difference in cell quality is determined based on a first signal quality estimate of the first cell 230 and a second signal quality estimate of the second cell 231.

In some embodiments the respective first and second quality estimate are estimates of received power, estimates of spectral efficiency or estimates of signal to interference ratio.

In some embodiments the difference in cell quality is established based on a handover margin value for the first cell and/or the second cell.

In some embodiments the processing circuit 704 is configured to set the threshold value to a non zero value when the difference in signal quality is below a second threshold value and wherein the processing circuit 704 is configured to set the threshold value to zero when the difference in signal quality is above the second threshold value. The threshold value may be set by the threshold setting circuitry 706.

In some embodiments the first handover is a handover from the first cell to the second cell and the second handover is a handover from the second cell to the first cell.

In some embodiments the first handover is a handover from the first cell to a third cell and the second handover is a handover from the third cell to the second cell.

In some embodiments the first handover is a handover from the first cell to the second cell and the second handover is a handover from the second cell to a third cell.

The network node 220, 221, 240, 241, 250 may further comprise a receiver 702, RX, and a transmitter 703, TX to receive and transmit data and/or control information to or from the network node 220, 221, 240, 241, 250. This is applicable, for example, when the determination of the type of handover is performed in one network node 220, 221, 240, 241, 250 and the adjustment of the handover parameters is performed in another network node 220, 221, 240, 241, 250. It would in this case be necessary send information regarding the type of handovers to the other network node 220, 221, 240, 241, 250.

The embodiments herein for determining a type of handover in a wireless communication network may be implemented through one or more processing circuits 704, such as a processor, in the network node 220, 221, 240, 241, 250 as depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the first base station 220, the second base station 221, the third base station, the first DM 240, the second DM 241 or the NM 250. One such carrier may be in the form of a CD ROM disc. It is however feasible with other data carriers such as a memory stick. The computer program code may furthermore be provided as pure program code on a server and downloaded to the first base station 220, the second base station 221, the third base station, the first DM 240, the second DM 241 or the NM 250.

The first base station 220, the second base station 221, the third base station, the first DM 240, the second DM 241 or the NM 250 may further comprise a memory 701 comprising one or more memory units. The memory 701 is arranged to be used to store data, received data streams, received information, configurations, schedulings, and applications to perform the methods herein when being executed in the first base station 220, the second base station 221, the third base station, the first DM 240, the second DM 241 or the NM 250.

Those skilled in the art will also appreciate that the determining circuitry 705, the threshold setting circuitry 706 or the adjusting circuitry 707 described above may refer to a combination of analog and digital circuits, and/or one or more processors configured with software and/or firmware, e.g. stored in a memory, that when executed by the one or more processors such as the processor 704 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

The invention claimed is:

1. A method in a network node including a processing circuit, for determining a type of handover in a wireless communication network, the method comprising:
   determining, by the processing circuit, a time period between a first handover and a second handover of user equipment wherein the first handover is to or from a first cell and the second handover is to or from a second cell;
   setting, by the processing circuit, a threshold value based on a difference in cell quality between the first cell and the second cell, wherein the difference in cell quality is associated with the first or second handover, and wherein the threshold value is set to zero in an event the difference in the cell quality between the first cell and the second cell is above a predetermined value; and
   determining, by the processing circuit, the type of handover, of at least one of the first and second handover, based on a comparison of the time period with the threshold value determined based on the difference in cell quality between the first cell and the second cell.

2. The method according to claim 1, wherein determining the type of handover comprises at least one of:
   determining the type of handover as being a first type of handover when the time period is below the threshold value; and
   determining the type of handover as being a second type of handover when the time period is above the threshold value.

3. The method according to claim 1, further comprising adjusting, by the processing circuit, one or more handover parameters of the wireless communication network based on the type of handover determined.

4. The method according to claim 3, wherein the one or more handover parameters are one or more of: a cell specific offset of the first cell, a cell specific offset of the second cell, a hysteresis value, and a time to trigger a handover.

5. The method according to claim 1, wherein the difference in cell quality is established based on a first signal quality estimate of the first cell and a second signal quality estimate of the second cell.

6. The method according to claim 5, wherein the respective first and second quality estimates are estimates of received power, estimates of spectral efficiency or estimates of signal to interference and/or noise ratio.

7. The method according to claim 1, wherein the difference in cell quality is determined based on a handover margin value for at least one of the first cell and the second cell.

8. The method according to claim 1, wherein setting the threshold value comprises setting the threshold value to a non-zero value when the difference in cell quality is below the predetermined value.

9. The method according to claim 1, wherein the first handover is a handover from the first cell to the second cell and the second handover is a handover from the second cell to the first cell.

10. The method according to claim 1, wherein the first handover is a handover from the first cell to a third cell and the second handover is a handover from the third cell to the second cell.

11. The method according to claim 1, wherein the first handover is a handover from the first cell to the second cell and the second handover is a handover from the second cell to a third cell.

12. A network node for determining a type of handover in a wireless communication network, the network node comprising a processing circuit configured to:
 determine a time period between a first handover and a second handover of user equipment wherein the first handover is to or from a first cell and the second handover is to or from a second cell;
 set a threshold value based on a difference in cell quality between the first cell and the second cell, wherein the difference in cell quality is associated with the first or second handover and wherein the threshold value is set to zero in an event the difference in the cell quality between the first cell and the second cell is above a predetermined value; and
 determine the type of handover, of at least one of the first and second handover, based on a comparison of the time period with the threshold value determined based on the difference in cell quality between the first cell and the second cell.

13. The network node according to claim 12, wherein the processing circuit is configured to perform at least one of:
 determine the type of handover as being a first type of handover when the time period is below the threshold value; and
 determine the type of handover as being a second type of handover when the time period is above the threshold value.

14. The network node according to claim 12, wherein the processing circuit is further configured to adjust one or more handover parameters of the wireless communication network based on the type of handover determined.

15. The network node according to claim 14, wherein the one or more handover parameters comprise one or more of: a cell specific offset of the first cell, a cell specific offset of the second cell, a hysteresis value, and a time to trigger a handover.

16. The network node according to claim 12, wherein the difference in cell quality is determined based on a first signal quality estimate of the first cell and a second signal quality estimate of the second cell.

17. The network node according to claim 16, wherein the respective first and second quality estimates are estimates of received power, estimates of spectral efficiency or estimates of signal to interference ratio.

18. The network node according to claim 12, wherein the difference in cell quality is established based on a handover margin value for at least one of the first and second cells.

19. The network node according to claim 12, wherein the processing circuit is configured to set the threshold value to a non-zero value when the difference in cell quality is below the predetermined value.

20. The network node according to claim 12, wherein the first handover is a handover from the first cell to the second cell and the second handover is a handover from the second cell to the first cell.

21. The network node according to claim 12, wherein the first handover is a handover from the first cell to a third cell and the second handover is a handover from the third cell to the second cell.

22. The network node according to claim 12, wherein the first handover is a handover from the first cell to the second cell and the second handover is a handover from the second cell to a third cell.

* * * * *